May 27, 1958 W. G. WILKINSON ET AL 2,835,974
AXONOMETRIC DRAFTING MACHINE
Filed June 14, 1952 5 Sheets-Sheet 1
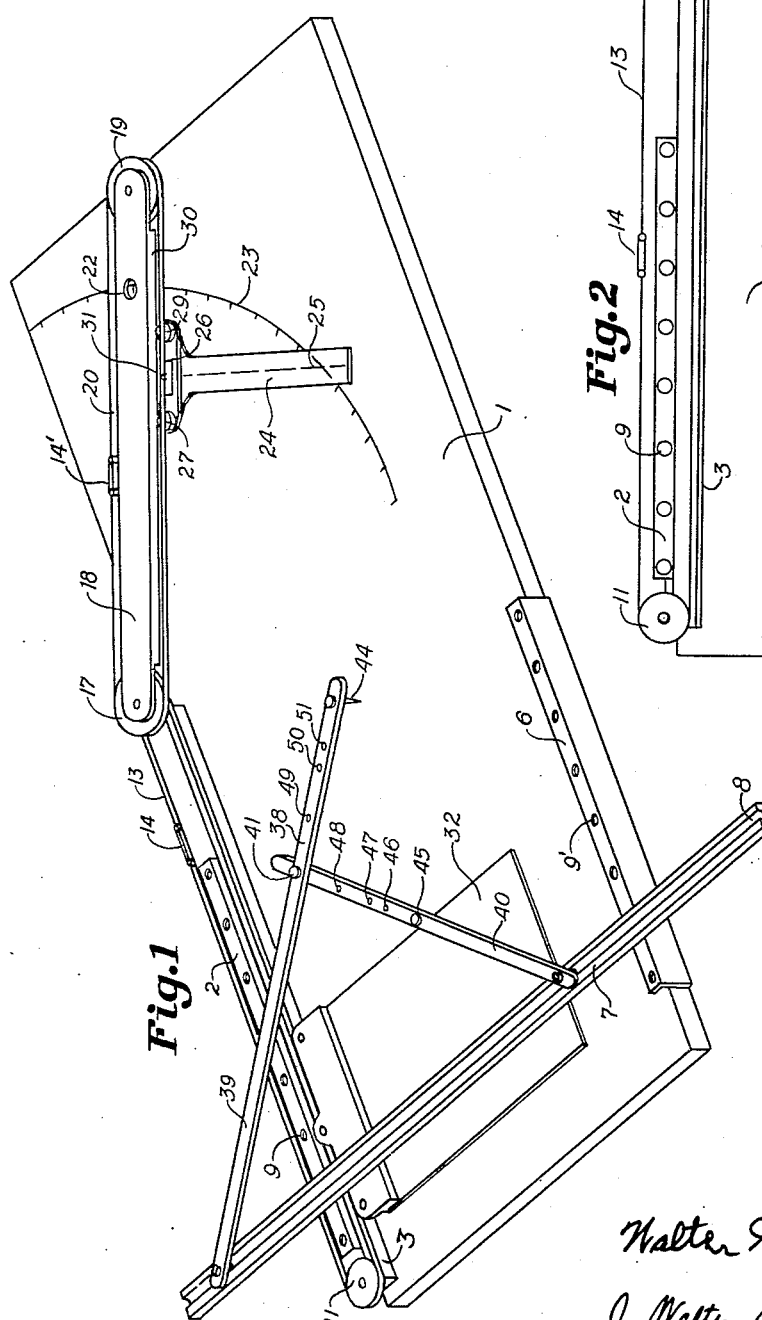
INVENTOR.
Walter G. Wilkinson
J. Walter Wilkinson

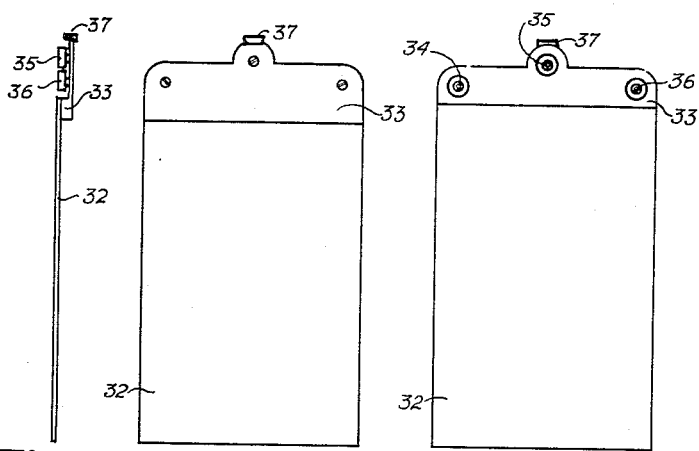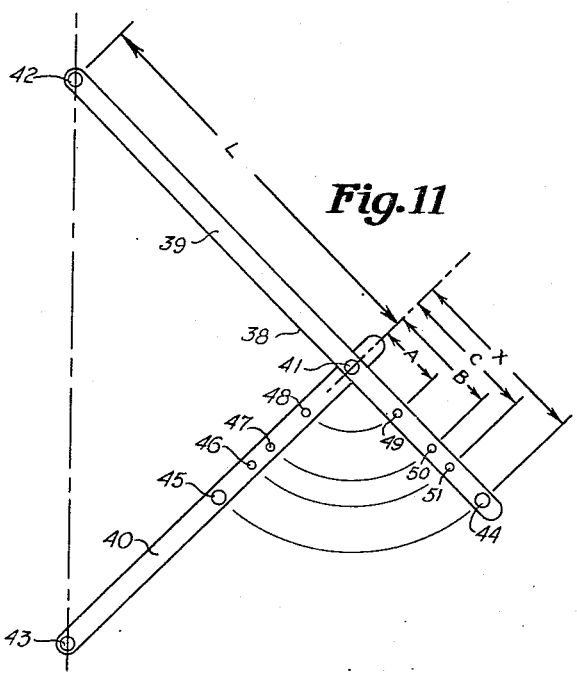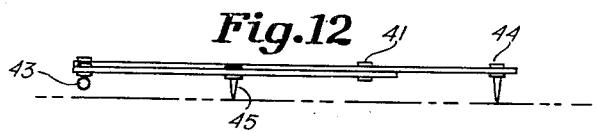

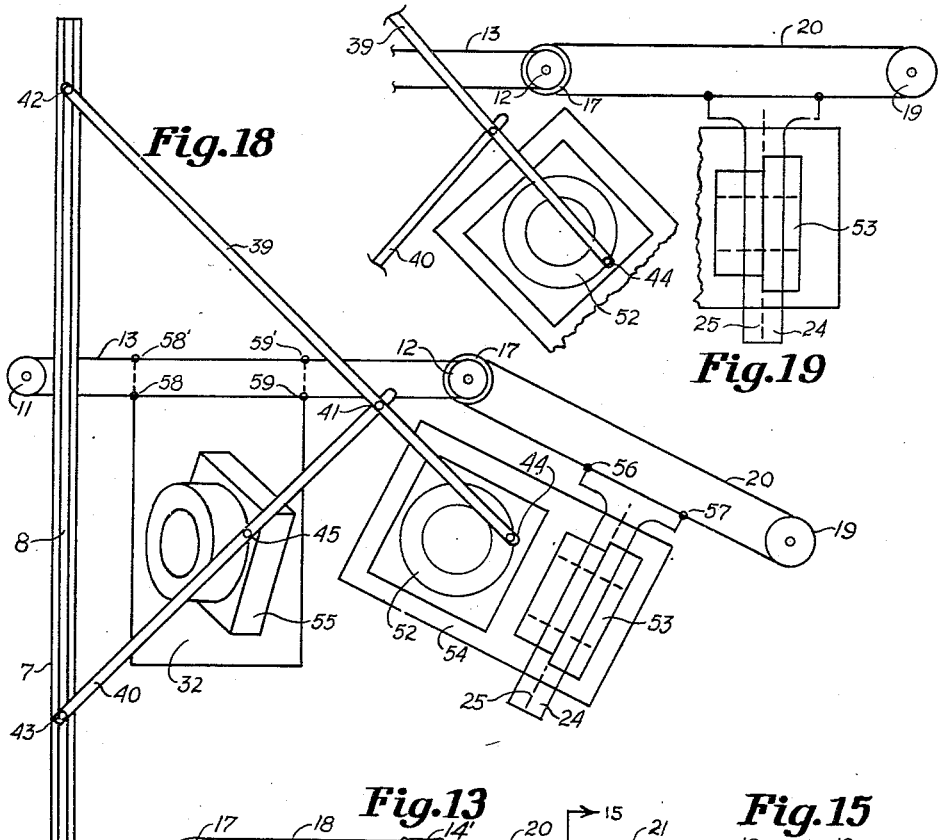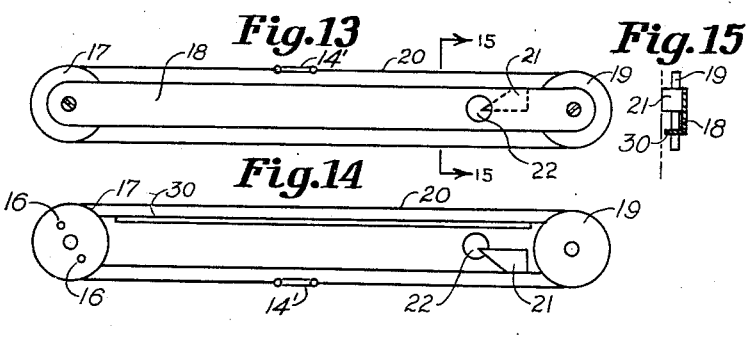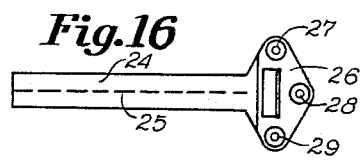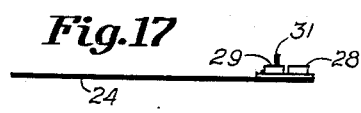

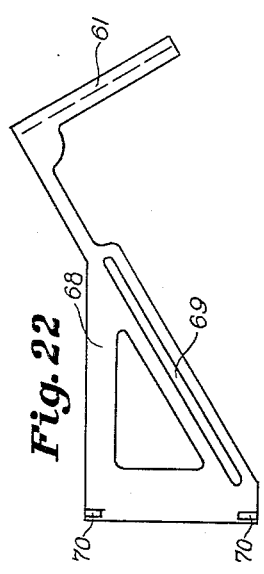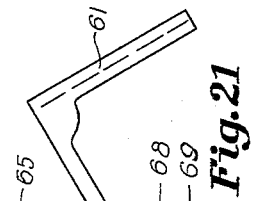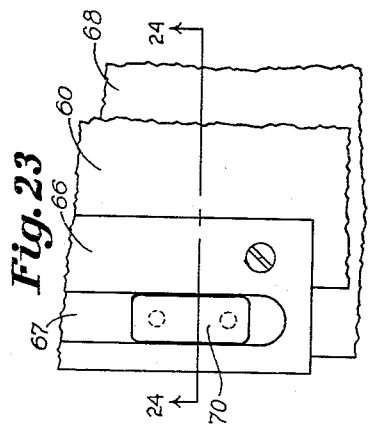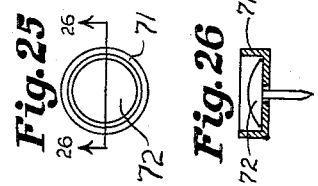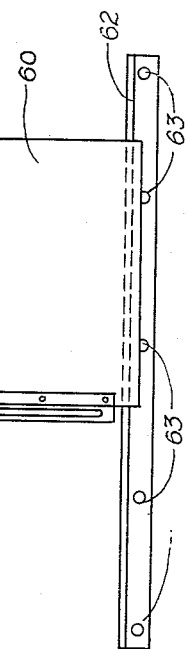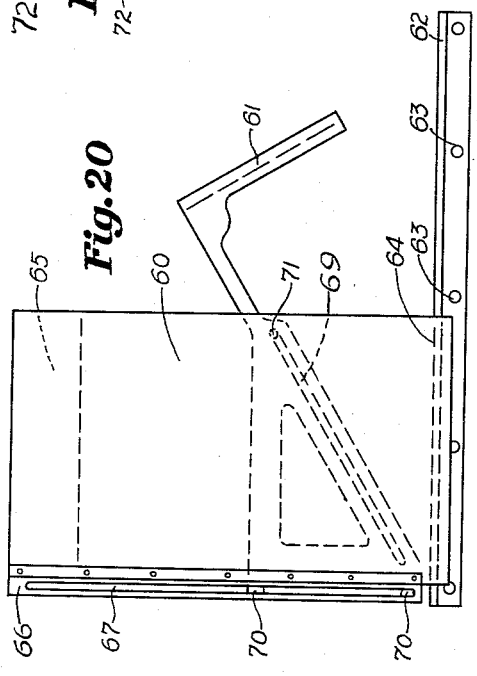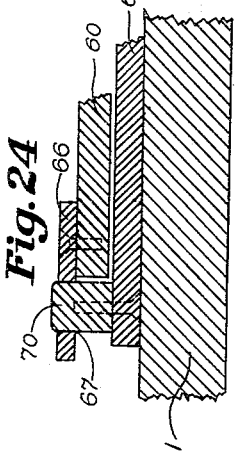

May 27, 1958  W. G. WILKINSON ET AL  2,835,974
AXONOMETRIC DRAFTING MACHINE
Filed June 14, 1952  5 Sheets-Sheet 5

INVENTOR.
Walter G. Wilkinson
J. Walter Wilkinson

United States Patent Office 2,835,974
Patented May 27, 1958

2,835,974

AXONOMETRIC DRAFTING MACHINE

Walter G. Wilkinson, Baltimore County, and John Walter Wilkinson, Anne Arundel County, Md.

Application June 14, 1952, Serial No. 293,508

7 Claims. (Cl. 33—23)

This invention relates to an axonometric drafting machine or drafting apparatus for the production of axonometric drawings from conventional orthographic projection.

Axonometric drawings afford the preferred pictorial representation for mechanical design or production illustration if they can be generated from orthographic views without requiring too much skill or complicated apparatus. In Patents Nos. 2,510,202 and 2,462,150 a method and apparatus are disclosed whereby axonometric views can be obtained from orthographic views of a drawing which can be assembled into axonometric projections through the use of photographic apparatus. This method requires some skill in selection and preparation of the views and in the several steps required to produce an axonometric drawing.

It is an object of the present invention to provide simplified principles and mechanical concepts which, when combined, will afford apparatus that will produce axonometric drawings from conventional orthographic projections.

It is another object of the present invention to provide a simplified axonometric drafting machine which will produce a complete axonometric drawing from the plan and side elevation, or any other selection of views, of conventional orthographic projection.

A further object of this invention is to provide an axonometric drafting machine that satisfies the mathematical and geometrical requirements for the accurate solution of any axonometric projection problem.

Other objects and advantages of this invention will be apparent from the following specification and drawings which form a part of the specification and in which like numerals refer to like parts.

Fig. 1 is an axonometric view of drafting apparatus constructed in accordance with this invention.

Fig. 2 is a fragmentary view showing the upper track support and pulley assembly.

Fig. 3 is a fragmentary view showing the upper track support and pulley mounting brackets.

Fig. 4 is a fragmentary sectional view of the upper track support taken on line 4—4 of Fig. 3.

Figs. 5, 6 and 7 are the plan, side and end views, respectively, of the track showing the track groove and mounting lugs.

Figs. 8, 9 and 10 are the edge, top and bottom views of the movable scribing board.

Figs. 11 and 12 are the plan and side elevations of the Y-arm.

Figs. 13 and 14 are the top and bottom views of the adjustable arm.

Fig. 15 is a sectional view taken on line 15—15 of Fig. 13.

Figs. 16 and 17 are the plan and side elevations of the movable depth-scanning member.

Fig. 18 is a diagrammatic arrangement of the principal elements of the apparatus of Fig. 1.

Fig. 19 is another embodiment of the invention wherein the depth-scanning member is fixed along the top edge of the drafting board rather than movable with respect to said top edge.

Fig. 20 is an embodiment of the invention wherein the relative motion of the scribing board and depth-scanning member are cam-actuated.

Fig. 21 shows relative position of the parts of Fig. 20 upon motion of the scribing board.

Fig. 22 is a plan view of the cam and depth-scanning member assembly.

Fig. 23 is an enlarged fragmentary plan of the cam and slot arrangement of the cam and scribing board.

Fig. 24 is a section taken on line 24—24 of Fig. 23.

Fig. 25 is a plan view of the pin assembly.

Fig. 26 is a sectional view taken on the line 26—26 of Fig. 25.

Figure 27:
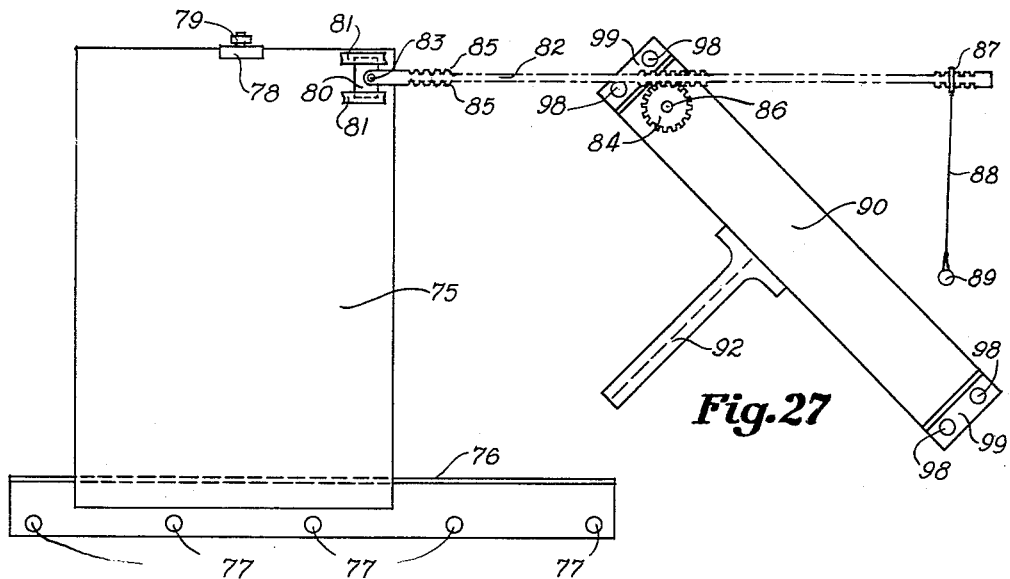
Fig. 27 shows a further embodiment of the invention in which a rack and pinion are used to determine the cosine relationship.

Axonometric drawing is the representation of lines and shapes projected onto the picture plane from a plane inclined at an angle to the picture plane. For the purposes of this explanation, the picture plane will be considered as a vertical plane. In axonometric projection, 90° minus the angle formed between the axonometric plane and the picture plane is referred to as the angle of slant of the axonometric plane. The angle of slant can be said to be the angle that the axonometric plane makes with the plane normal to the picture plane through their line of intersection, or in this explanation, a horizontal plane. The smaller the angle of slant, the smaller is the projection, on the picture plane, of a line normal to said intersection, on the plane inclined to the picture plane. If the angle of slant is 0°, the axonometric plane becomes a line on the picture plane and a line on the axonometric plane normal to said intersection has a point for its projection on the picture plane. If the axonometric plane has an angle of slant of 90°, the axonometric plane coincides with the picture plane and a normal orthographic view results. However, if the angle of slant is somewhere between 0° and 90°, then the axonometric view of an orthographic view appearing thereon is difficult to construct, but can be drawn by the axonometric drafting machine.

If the circle is drawn on the axonometric or inclined plane, its axonometric projection is an ellipse with its major axis the full projection of the diameter of the circle, if said major axis is parallel to the intersection of the two planes. Lines parallel to the line of intersection of the two planes are not reduced in length. If the circle is considered to be graduated in degrees in the inclined or axonometric plane, it will form a protractor that will measure the angle of position of any line on the plane. For purposes of discussion, the 0 degrees to 180 degrees diameter will be considered as a line parallel to the intersection of the picture plane and the inclined or axonometric plane. A line, therefore, with an angle of position of 0 degrees on the inclined plane is projected full scale on the picture plane, while a line with an angle of position of 90 degrees has the smallest coefficient of reduction possible of any line projected from the inclined plane to the picture plane. In other words, in the projection of a circle referred to above, the major axis is in full projection because its angle of position is 0 degrees and the minor axis has an angle of position of 90 degrees and, therefore, is the smallest diameter of the ellipse.

Expressed in trigonometry, the coefficient of reduction of a line in an angle of position of 90 degrees in the inclined plane, projected on the picture plane, is equal to the sine of its angle of slant.

The axonometric view is essentially a three dimensional picture and, therefore, the "thickness" must be developed. This "thickness" must be measured at right angles to the inclined plane and, therefore, the function can be readily understood to be equal to the cosine of the angle of slant.

As will subsequently be described, these trigonometric relationships are embodied in this invention by having the Y-arms, or a pair of arms, constructed and arranged to carry a pointer over an orthographic drawing and a marker over a scribing board, set in predetermined relationship in accordance with the angle of slant, and further having the cosine or thickness ratio for the depth dimension, determined mechanically by pulleys, cams, gears or any other mechanism, for the same angle of slant from the orthographic views. In other words, the sine function of the angle of slant determines the fore-shortening in the picture plane of dimensions in angles of position except those of 0°, and the cosine function develops the "thickness" ratio of the axonometric view.

An embodiment of the invention is illustrated in detail in Figs. 1 to 18, wherein a drafting board or table 1 has attached to the top edge an upper track support and pulley assembly consisting of upper track support 2, scribing board guide 3, pulley brackets 4 and 5 secured thereto. A lower track support 6 is secured to the opposite edge of board 1. Track supports 2 and 6 and guide 3 may be bent metal angles or extrusions. Track 7 is shown as a channel of metal, or any equivalent material, for rigidity, and is mounted on track supports 2 and 6. A guide or track groove 8 extends the length of track 7. Track supports 2 and 6 have aligned apertures 9—9' formed therein. Semi-spherical lugs 10—10' on track 7 cooperate with apertures 9—9' to align track 7 and permit the adjustment of the track with respect to board 1, so that the track may extend over the edges of the board as may be required.

Around pulleys 11 and 12 extends a flat metal band 13, maintained taut by turnbuckle 14. It is to be understood that any type of band and tensioning member may be employed that will transmit the motion of pulley 12. Pulley 12 has holes 15 formed therein to receive pins 16 of pulley 17 of the movable arm assembly 18 shown in Figs. 13–15.

Movable arm assembly 18, illustrated in detail in Figs. 13 to 15, has pulleys 17 and 19, on which is mounted a band 20 similar to band 13, having a tensioning turnbuckle 14' or other suitable tensioning means. Pins 16 in pulley 17 engage holes 15 in pulley 12 and the end of the arm assembly 18 is supported in a pivotal relationship to the upper track support and pulley assembly by pulley 17 engaging pulley 12. The other end of the movable arm assembly 18 rests on the drawing board 1 and is supported by block 21 which is also formed to function as a position indicator through aperture 22. Scale 23 may be viewed through aperture 22 to facilitate the angular location of arm 18 on board 1 to determine the angle of position of the orthographic plan and side views to obtain the desired axonometric views.

A movable member 24 similar to a T-square is illustrated in detail in Figs. 16 and 17. Member 24 slides over board 1 and serves as a depth-scanner on the side elevational view of an orthographic projection. Member 24 is preferably formed of transparent material so that a drawing may be viewed through it and the registration of line 25 with the lines on the orthographic drawing observed. Member 24 may be made of any opaque material and the edge of the member may be used in the same manner as a conventional T-square, for the purposes described above, of line 25. The head 26 extends transversely of member 24 and has mounted thereon three guide wheels 27, 28 and 29. Wheels 27 and 29 engage one side of flange 30 (see Figs. 14 and 15) on movable arm 18 and wheel 28 engages the other side of said flange.

Member 24 is thus adapted to bear on a drawing on board 1 and move along arm 18 while extending laterally therefrom, maintaining a normal position with respect to said arm. Bracket 31 serves the dual function as a handle to manually effect movement of member 24 along arm 18 and also serves as a point of attachment of member 24 to band 20. It will be seen, as member 24 is manually moved to scan the depth dimensions of an orthographic view, it moves band 20 and pulley 17.

Figs. 8, 9 and 10 illustrate a scribing board 32 having a head 33 adapted to be mounted to move along the flange or guide 3 of the upper track and pulley assembly. Head 33 has three guide wheels 34, 35 and 36. Wheels 34 and 36 are arranged to engage one side of guide 3 and wheel 35 engages the opposite side of said guide. It will be seen that scribing board 32 can readily be moved across the drawing board of table 1 under track 7 on guide 3. The head of scribing board 32 is secured by any suitable means as at bracket 37 to band 13. As shown in Fig. 1, head 33 is shown attached to the lower side of band 13, but it is contemplated that bracket 37 be so constructed and arranged as to be secured to either the upper or lower side of band 13 and thus reverse its direction of movement when pulleys 11 and 17 and band 13 are moved.

The Y-arm generally indicated as 38, is shown in Fig. 1 mounted on track 7. The Y-arm consists of members 39 and 40 pivoted at 41 to form as isosceles triangle with track 7. Members 39 and 40 have track-engaging slides 42 and 43 on the ends of the arms remote from the pivot. Arm 39 extends beyond pivot 41 and is adapted to carry pointer 44. A scribe member or marker 45 is adapted to be mounted on arm 40. Pointer 44 and marker 45 are always located equal distances from pivot 41. Holes 46, 47 and 48 are alternate positions for marker 45 and holes 51, 50 and 49 are corresponding alternate positions for pointer 44.

The distance X, shown in Fig. 11, or the distance from pivot 41 to pointer 44 is a function of the angle of slant as described above. If pointer 44 is moved toward track 7, marker 45 also moves toward track 7. At the same time, slides 42 and 43 move in opposite directions along track 7. If it were physically possible to close arms 39 and 40, they would coincide along track groove 8. If it were possible to extend arms 39 and 40 to the fullest extent, they would form a line at right angles to track 7. In moving from the closed to opened or extended position, the pointer 44 moves a distance L plus the distance X. At the same time, the marker 45 has moved a distance L minus the distance X. Any movement of pointer 44 parallel to track 7 causes an identical movement of marker 45 in the same direction. It will, therefore, be seen then if pointer 44 traces an orthographic plan view, marker 45 will reproduce, on the scribing board 32, true lengths of dimensions parallel to track 7 while dimensions at right angles to track 7 are reduced as a function of the angle of slant. The lengths of arm portions L and X, or the ratio of portion X to distance L can be expressed:

$$\text{sine} \angle \text{angle of slant} = \frac{L-X}{L+X}$$

or $$X = \frac{L(1 - \text{sine of angle of slant})}{1 + \text{sine of angle of slant}}$$

For any selected angle of slant, the location of holes in arms 39 and 40 can be determined to receive the pointer 44 and the marker 45.

Fig. 18 is a diagrammatic sketch showing the application of the principles described above and the function and operation of the essential parts. An orthographic drawing 54 comprising plan view 52 and side elevation 53 is mounted on the drafting table or board 1. Movable member 24, carrying depth-scanning index 25, is mounted in a predetermined angle of position for the desired axonometric view. If an isometric drawing is desired, wherein the angles of the bases of the two sides are equal, the plan view is placed at 45 degrees to a line parallel to track 7. Any or all other positions will result in axonometric views. Side elevation view 53 is aligned with respect to member 24 so that indicia 25 scans the depth dimensions. As member 24 is moved from the top plane to the bottom plane of the side elevation view, it moves band 20 since it is attached thereto as shown (schematically) at points 56 and 57. Pulleys 17 and 19 are moved upon motion of band 20. Pulley 17 is adapted to engage and move pulley 12, which, in turn, moves band 13 and pulley 11. Scribing board 32 is mounted to move upon motion of band 13. If scribing board 32 is secured to the lower side of band 13 as shown schematically at 58 and 59 then, as indicia 25 moves from plane to plane over the side elevational view 53 of the orthographic drawing, scribing board 32 moves in conjunction with motion of member 24. It will be noted that pulleys 17 and 12 are of different diameters and, therefore, bands 20 and 13 will move different amounts in proportion to the pulley ratio. The pulley ratio is selected as equal to the cosine of the angle of slant to achieve a lesser amount of motion of the scribing board as compared with motion of member 24 in the depth dimension direction or the exact amount of foreshortening of depth dimensions for the desired axonometric projection as determined by the angle of slant for the particular projection.

The Y-arm is mounted to slide along track groove 8 on slides 42 and 43. The track is adjusted horizontally and vertically to position marker 45 over the area of the scribing board 32 on which the axonometric view will be drawn as pointer 44 traces the orthographic view 52 on a plane determined by the position of indicia 25 on the side elevational view 53. Any motion of pointer 44 parallel to track 7 is reproduced in true length by marker 45. Any motion of pointer 44 normal to track 7 will move marker 45 a reduced amount, reduced by the sine function of the angle of slant. It will, therefore, be seen that as pointer 44 traces the circles of plan view 52, that in axonometric view 55, ellipses will be drawn on scribing board 32 that have major axes equal to the diameters of the circles and minor axes properly proportioned for the desired angle of slant. Pointer 44 traces all lines that appear in the plane over which indicia 25 is placed and marker 45 draws corresponding lines on scribing board 32 properly foreshortened in dimensions normal to track 7, but of true length parallel to track 7. As pointer 44 is maintained stationary over a point, as, for example, over the point of intersection of the sides of the square portion of the object, and member 24 is moved from the plane in which the line originates to the plane in which the line terminates, marker 45 will draw a line representing the distance between such planes properly foreshortened in accordance with the cosine of the angle of slant of the axonometric view.

Fig. 19 is a diagrammatic view similar to Fig. 18 showing another arrangement of the structure of the apparatus wherein the movable arm assembly 18 carrying movable member 24 is permanently fixed along the top of the drawing board or table 1. This arrangement necessitates separating orthographic views 52 and 53 of drawing 54. In some cases, it is advantageous, particularly in larger views, to use this arrangement and take full advantage of all the space on the drawing board or table. View 52 can be arranged in the proper angle of position under pointer 44 to achieve the desired axonometric view on scribing board 32.

The upper and lower track supports, together with the track and Y-arm assembly, afford the preferred apparatus for the conversion of plan dimensions of the orthographic view to the corresponding dimensions of the axonometric view. However, there are other mechanisms besides the two embodiments shown in Figs. 18 and 19 that can be employed to effect predetermined relative motion of the scribing board and movable depth-scanner in accordance with the cosine of the angle of slant.

Figs. 20 to 26 illustrate a movable scribing board and depth-scanner actuated by a cam mechanism so that the motion of scribing board 60, compared with the corresponding motion of member 61, is a function of the cosine of the angle of slant of the axonometric drawing.

A angle channel or guide 62 is secured on a drawing board or table 1 and extends normal to a track and Y-arm assembly similar to that shown in Fig. 1. Guide 62 is secured to said table as, for example, by thumb tacks 63. Scribing board 60 has a groove 64 adapted to engage guide 62 to support one end of board 60 in sliding relation thereto. The top end of board 60 is supported in spaced relation to table top or drawing board 1, on which the assembly is mounted by block 65 extending across the top of board 60. Strip 66, having a slot 67 formed therein, is secured to board 60. Cam member 68, as shown in Fig. 22, has depth-scanner 61 secured thereto, and has formed therein cam slot 69. Guide blocks 70 are secured along the opposite side (from member 61) of cam member 68. Pin 71 is secured to table 1 and can be of any suitable construction to engage cam slot 69. It is shown as a cup 71 secured to board 1 by thumb tack 72. When guide 62 is secured to board 1, pin 71 is located in a predetermined position with respect thereto, so that cam member 68 may be placed on the board 1 with cam slot 69 around pin 71. Scribing board 60 is then placed with groove 64 engaging guide 62 and with guide block 70 extending upward through slot 67. Cam slot 69 is formed at an angle to effect motion of member 61 as it scans depth dimensions of the side elevational view of an orthographic view as scribing board 60 is moved along guide 62. The position of scribing board 60 along guide 62 can readily be determined by observing the position of the edge of member 61 or the indicia carried thereon, relative to any depth dimensions on the orthographic side elevation since, as scribing board 60 is moved to the right along guide 62, member 68 is moved in the direction of cam slot 69 relative to pin 71. Guide blocks 70 in slot 67 restrain motion of member 68 to vertical motion relative to scribing board 60 while moving along cam slot 69 relative to pin 71.

Figure 28:
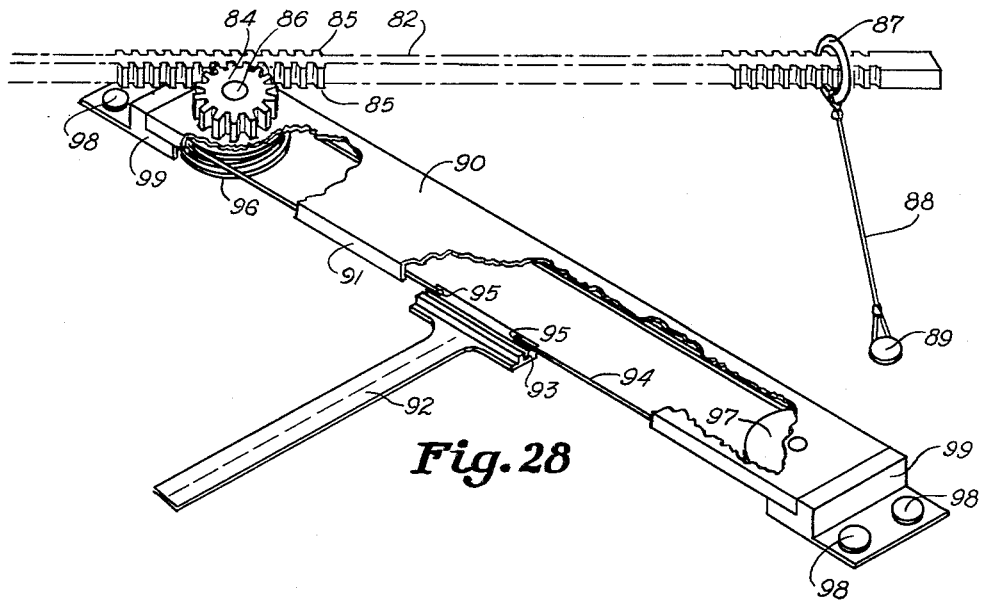
Fig. 28 is an enlarged fragmentary view of the mechanism for scanning the depth dimensions.

Another mechanism that can be employed to scan the depth dimensions and convert them into properly foreshortened dimensions on the axonometric drawing is illustrated in Figs. 27 and 28. The mechanism shown in Figs. 27 and 28 is used in connection with our conventional Y-arm and vertical track 7 on a drafting board or table.

A scribing board 75 is adapted to slide along angle 76, one side of which is secured to the drafting table by thumb tacks 77. A bracket 78 is secured to the top of the board 75 and a roller 79, secured to bracket 78, facilitates the motion of scribing board 75 along guide 76. A rack 82 having gear engaging teeth on each side is secured by pivot 83 to plate 80. Plate 80 is shown attached to any convenient part of scribing board 75 by strips of drafting tape or tacky tape 81.

The assembly 90 to which depth-scanner 92 is secured can be located wherever convenient on the drafting table and secured thereto by thumb tacks 98. Member 90 is formed with a flange 91 at one side and is secured to end brackets 99. Depth-scanning member 92 has a groove 93 formed therein to engage flange 91. A pulley 97 on one end of 90 affords a support for band or cord 94. Pulley 96 is fixed on shaft 86, as is gear 84, so that the pulley 96 and gear 84 move together. Band or cord 94 may be wrapped once or twice around pulley 96 to insure motion of the movable depth-scanner 92 to which band 94 is attached at 95 being transmitted to gear 84. The gear 84 and pulley 94 are selected to effect a motion of the rack 82, and thereby scribing board 75, in proportion to the cosine of the angle of slant. A set of gears can be made and the proper gear selected for the predetermined angle of slant and mounted on pivot 86 in each case.

Rack 82 extends normal to track 7 and engages gear 84. It is held against the gear by a ring 87 on an elastic cord 88, secured to the drafting table by thumb tack 89.

If it is desired to have scribing board 75 and depth-scanning member 92 move in the same direction rather than in opposition, as shown in the drawing, it is merely necessary to have rack 82 engage the opposite side of gear 84. In this case thumb tack 89 will be moved to the other side of the rack to hold said rack against the gear.

It is to be understood from the several embodiments of the invention above described that variations can be made without departing from the spirit and scope of the depending claims.

We claim:

1. A mechanism for drawing an exonometric projection from orthographic projections comprising a track, a pair of arms joined together adjacent one end by a pivot, the ends of said arms remote from said pivot adapted to slidably engage said track, said arms and said track forming an isosceles triangle with said track forming the base thereof, one of said arms being of such a length as to extend beyond said pivot, a pointer adapted to be mounted on said portion of said arm extending beyond said pivot point, and a marker adapted to be mounted on the other arm the same distance from said pivot as said pointer, a scribing board movably mounted and positioned under said marker, said marker adapted to contact and trace on said scribing board an axonometric plan view as said pointer traces an orthographic plan view, means whereby said scribing board may be moved normal to said track, a movable member having an indicator thereon adapted to be placed over and to scan depth dimensions of the side elevation of an orthographic projection, means interconnecting said movable member and said scribing board to effect predetermined relative motion of said scribing board and said movable member.

2. A mechanism for drawing an axonometric projection from an orthographic projection comprising a track, a pair of arms joined together adjacent one end by a pivot, the ends of said arms remote from said pivot adapted to slidably engage said track, said arms and said track forming an isosceles triangle with said track forming the base thereof, one of said arms being of such a length as to extend beyond said pivot, a pointer adapted to be mounted on said portion of said arm extending beyond said pivot point, and a marker adapted to be mounted on the other arm the same distance from said pivot as said pointer, a scribing board movably mounted under said marker, said marker adapted to contact and trace on said scribing board an axonometric plan view as said pointer traces an orthographic plan view, a movable depth-scanning member adapted to be placed over and to scan depth dimensions of the side elevation of an orthographic projection, means interconnecting said movable depth-scanning member and said scribing board to move said scribing board relative to said movable member, the relative motion being proportional to the cosine of the angle of slant of the axonometric projection.

3. A motion translating lever system for a mechanism for drawing an axonometric projection from an orthographic projection comprising a track, a pair of arms joined together adjacent one end by a pivot, the ends of said arms remote from said pivot adapted to slidably engage said track, said arms and said track forming an isosceles triangle with said track forming the base thereof, one of said arms being of such a length as to extend beyond said pivot, a pointer adapted to be mounted on said portion of said arm extending beyond said pivot point, and a marker adapted to be mounted on the other arm the same distance from said pivot as said pointer, said marker adapted to trace an axonometric plan view as said pointer traces an orthographic plan view, said marker and pointer being selectively positioned with respect to said pivot depending upon the angle of slant of the axonometric projection.

4. A mechanism for drawing an axonometric view from orthographic projections comprising a track, a pair of arms joined together adjacent one end by a pivot, the ends of said arms remote from said pivot adapted to slidably engage said track, said arms and said track forming an isosceles triangle with said track forming the base thereof, one of said arms being of such a length as to extend beyond said pivot, a pointer adapted to be mounted on said portion of said arm extending beyond said pivot point, and a marker adapted to be mounted on the other arm the same distance from said pivot as said pointer, the distance of the marker and pointer from said pivot being such as to affect the amount of foreshortening for any predetermined angle of slant, a scribing board movably mounted and positioned under said marker, said marker adapted to contact and trace on said scribing board an axonemtric view as said pointer traces an orthographic plan view, a movable depth-scanning member having an indicator thereon adapted to be placed over and to scan depth dimensions of the side elevation of an orthographic projection, and means interconnecting said movable depth-scanning member and said scribing board to effect predetermined relative motion of said scribing board and said movable member.

5. A mechanism for drawing an axonometric projection from orthographic projections comprising a track, a pair of arms joined together adjacent one end by a pivot, the ends of said arms remote from said pivot adapted to slidably engage said track, said arms and said track forming an isosceles triangle with said track forming the base thereof, one of said arms being of such a length as to extend beyond said pivot, a pointer adapted to be mounted on said portion of said arm extending beyond said pivot point, and a marker adapted to be mounted on the other arm the same distance from said pivot as said pointer, a scribing board movably mounted and positioned under said marker, said marker adapted to contact and trace on said scribing board an axonometric plan view as said pointer traces an orthographic plan view, means whereby said scribing board may be moved normal to said track, a movable member having an indicator thereon adapted to be placed over and to scan depth dimensions of the side elevation of an orthographic projection, means interconnecting said movable member and said scribing board to effect motion of said scribing board relative to said orthographic plan view to determine the thickness ratio in said axonometric view scribed thereon in accordance with the cosine of the angle of slant.

6. A mechanism for drawing axonometric projections from orthographic projections comprising track means, a lever system comprising a plurality of lever arm means pivotally interconnected and adapted to slidably engage said track means whereby said lever arm means may be moved bodily in a direction parallel to said track means, portions of said lever arm means engaging said track means forming therewith an isosceles triangle, a pointer means for tracing an orthographic projection mounted on a portion of said lever arm means remote from said track means, a marker means for scribing an axonometric projection mounted on a portion of said lever arm means located on a line extending perpendicular to said track means through said pointer means at a different distance from said track means than said pointer means, said aligned marker and pointer means being positioned on said lever system so that the line through said marker and pointer means perpendicular to said track is within the base line of said isosceles triangle, said marker means being located on said lever arm means at a point so that motion of said pointer means produces motion of said marker means along said line perpendicular to said track means which motion is proportionate to the sine of the angle of slant of the axonometric projection.

7. A mechanism for drawing axonometric projections from orthographic projections comprising track means, a lever system comprising a plurality of lever arm means pivotally interconnected and adapted to slidably engage said track means whereby said lever arm means may be moved bodily in a direction parallel to said track means, portions of said lever arm means engaging said track means forming therewith an isosceles triangle, a pointer means for tracing an orthographic projection mounted on a portion of said lever arm means remote from said track means, a marker means for scribing an axonometric projection mounted on a portion of said lever arm means located on a line extending parallel to the altitude of said isosceles triangle through said pointer means at a different distance from said track means than said pointer means, said marker means located on said lever arm means at a point so that motion of said pointer means produces motion of said marker means along said line perpendicular to said track means, said marker means being positioned on said lever system with respect to said pointer means so that motion of said pointer means produces motion of said marker means proportionate to the sine of the angle of slant of the axonometric projection.

References Cited in the file of this patent

UNITED STATES PATENTS

| | | |
|---|---|---|
| 364,043 | Riche | May 31, 1887 |
| 1,320,321 | Crowley | Oct. 28, 1919 |
| 1,651,757 | Evertz | Dec. 6, 1927 |
| 1,918,216 | Sachtleber | July 11, 1933 |
| 2,497,013 | Raynes | Feb. 7, 1950 |
| 2,553,026 | Williams | May 15, 1951 |
| 2,587,585 | Ayres | Mar. 4, 1952 |
| 2,615,251 | Edmunds | Oct. 28, 1952 |

FOREIGN PATENTS

| | | |
|---|---|---|
| 661,980 | Great Britain | Nov. 28, 1951 |